UNITED STATES PATENT OFFICE.

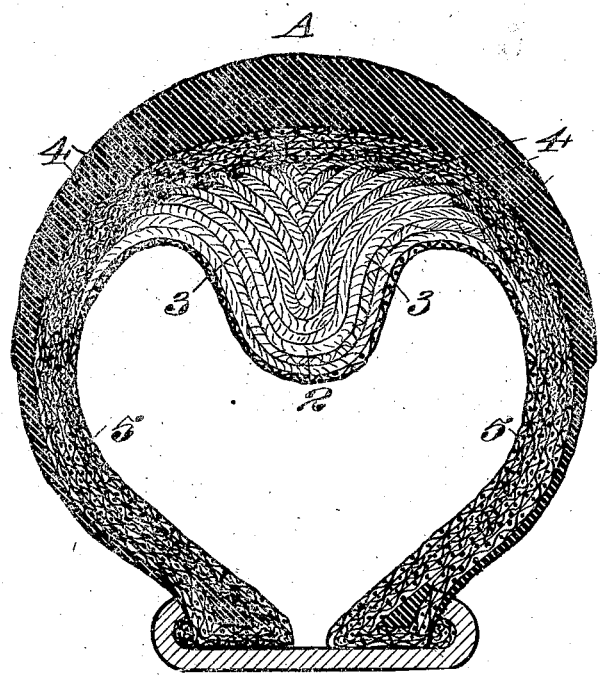

WILLIAM E. TRAVERS, OF OAKLAND, CALIFORNIA, ASSIGNOR OF ONE-HALF TO E. E. TREFETHEN, OF OAKLAND, CALIFORNIA.

TIRE.

1,162,321.  Specification of Letters Patent.  Patented Nov. 30, 1915.

Application filed April 17, 1915. Serial No. 22,008.

*To all whom it may concern:*

Be it known that I, WILLIAM E. TRAVERS, a citizen of the United States, residing at Oakland, in the county of Alameda and State of California, have invented new and useful Improvements in Tires, of which the following is a specification.

This invention relates to resilient vehicle tires and pertains especially to puncture-proof pneumatic tires for automobiles and the like.

The object of the invention is to provide an automobile tire which will have all the qualities of resiliency possessed by the ordinary pneumatic tire, yet which will be built up in a special way on the inside so that the life of the tire will be increased and the tire rendered puncture-proof.

The invention consists of the parts and the combination and construction of parts as hereinafter more fully described and claimed, having reference to the accompanying drawings, in which the figure shows a cross section of a tire casing embodying my invention.

The invention resides in the building up of a continuous circumferential reinforcing rib 2 on the inside of the casing A so that this reinforcing, which is substantially V-shaped in cross section will have its base extending over and in contact with substantially the entire inner side of the tread area of the tire; this rib being made up of fabric layers 3 so arranged that the layers will lie in convergent planes with the edges of the fabric presented to resist the entry of nails and other puncturing instruments. These fabric layers are vulcanized or cemented to the main body of the casing so as to form an integral part thereof. Preferably alternate layers have their lateral edges 4, or what would be their ends, in cross section brought down on the inside of the casing and built into the same: the intermediate layers having their edges terminating radially against the tread portion of the tire. In other words, the reinforce is preferably made up of alternating wide and narrow strips of fabric, but all of them laid in V-shaped formation, so that the legs of the V's all lie in radii of the tire. The result is that any nails or tacks puncturing the main body of the casing will strike against the edges of the fabric layers, thus offering a very much greater resistance to puncture than if the fabric were simply laid crosswise or circumferentially as with the ordinary fabric layers in the regular body of the casing itself. If desired, a protecting canvas skin 5 may be extended over the entire inner surface of the tube against which the usual inflatable tube 6 may expand.

Another advantage in addition to the non-puncture feature of the tire is that if for any reason, as for instance a leaking valve, the tire should become deflated, the wheel could yet be run without injury to the tire or rims, since the apex of the rib would merely be depressed against the flat portion of the metal wheel rim without the edges of the rim coming in contact with the ground.

Having thus described my invention, what I claim and desire to secure by Letters Patent is—

1. A pneumatic tire for vehicles, comprising a casing having a centrally thickened tread portion consisting of a somewhat V-shaped annular rib formed on the interior thereof and made up of a series of plies of fabric of the same general cross sectional shape, said plies having their diverging sides arranged substantially radial to the curved tread portion of the casing.

2. A pneumatic tire for vehicles, comprising a casing having a centrally thickened tread portion formed by a substantially V-shaped annular rib on the interior thereof, said rib consisting of a series of plies of fabric, the alternate layers of which extend into the casing and the intermediate layers terminate approximately at their point of contact with the casing.

In testimony whereof I have hereunto set my hand in the presence of two subscribing witnesses.

WILLIAM E. TRAVERS.

Witnesses:
 M. C. CHAPMAN,
 WM. S. WELLS, Jr.